United States Patent [19]

Wilson

[11] Patent Number: 4,965,940
[45] Date of Patent: Oct. 30, 1990

[54] METHOD AND APPARATUS FOR ALIGNING A SAWMILL GUIDE RAIL

[76] Inventor: Harry Wilson, 143 Woodlawn Ave., Sunbury, Pa. 17801

[21] Appl. No.: 330,819

[22] Filed: Mar. 30, 1989

[51] Int. Cl.[5] .......................... E01B 5/02; E01B 35/00
[52] U.S. Cl. ..................... 33/651.1; 33/651; 33/287; 33/523; 33/1 Q; 238/122
[58] Field of Search ...................... 33/287, 523, 523.1, 33/523.2, 651, 1 Q, 338, 651.1; 238/122, 136, 137, 148, 129, 125, 126, 130, 140, 142

[56] References Cited

U.S. PATENT DOCUMENTS

| | | | |
|---|---|---|---|
| 590,792 | 9/1897 | Pierpoint | 238/122 |
| 926,770 | 7/1909 | Roller | 33/338 |
| 1,801,112 | 4/1931 | Schultz et al. | 33/287 |
| 1,836,496 | 12/1931 | Percy | 83/713 |
| 4,324,048 | 4/1982 | Frost | 33/287 |

FOREIGN PATENT DOCUMENTS

| | | | |
|---|---|---|---|
| 16107 | of 1891 | United Kingdom | 238/125 |
| 21029 | of 1907 | United Kingdom | 238/148 |
| 2622174 | 12/1977 | United Kingdom | 238/122 |

*Primary Examiner*—William A. Cuchlinski, Jr.
*Assistant Examiner*—Patrick R. Scanlon
*Attorney, Agent, or Firm*—Waldron & Associates

[57] ABSTRACT

A saw mill guide rail capable of being quickly, easily and accurately aligned to the saw blade, having two intersecting surfaces machined into the head of the rail, each parallel to the rail head length and extending for the length of the rail, one being vertical and the other being horizontal, to thereby form a line of intersection, such that a straight-edge can be positioned against one or both said planar surfaces at the line of intersection to align the rail in a straight line in either or both the vertical and horizontal plane.

5 Claims, 4 Drawing Sheets

METHOD AND APPARATUS FOR ALIGNING A SAWMILL GUIDE RAIL

BACKGROUND OF THE INVENTION

This invention relates generally to sawmill guide rails, and more particularly to a unique new sawmill guide rail which provides a quick, simple and accurate method of aligning the guide rail to the sawmill saw blade.

Sawmills, as utilized in commercial operations, typically comprise three individual main parts; namely (1) the frame, or husk, which contains the saw blade and the saw blade drive machinery, (2) the carriage upon which the logs are mounted and which carries the log into the saw blade so that lumber can be cut from the log, and (3) a pair of tracks upon which the carriage rolls Such sawmills may utilize either a circular saw blade, or a band saw blade. Band saw blades may be either single cut, having teeth only on one edge thereof, or double cut, having teeth on both edges thereof. The double cut band saw blades offers the advantage of increased production in that the log can be cut as the carriage is moved in either directions.

The carriage is normally a large rectangular frame member mounted on two or more axles with steel wheels thereon which are adapted to roll on the pair of tracks. The upper surface of the carriage is provided with two or more clamping devices adapted to securely grip a log and hold it in a longitudinal fixed position on the carriage, with one side of the log extending beyond the edge of the carriage. Accordingly, movement of the carriage along the tracks in front of the saw blade will advance the log into the saw blade so that a length of board is cut therefrom.

As should be apparent, the tracks are parallel to each other, and must also be parallel to the saw line, i.e. parallel to the plane of motion of the saw blade, passing in front thereof, so that the carriage will move over the tracks passing in front of the saw blade in a path parallel to the saw line.

Normally, the two parallel tracks are not identical, in that one is merely a flat length of steel for support of the carriage and the load thereon. The other track, however, is a guide rail which serves the same function in supporting the carriage and its load, but in addition serves to guide the carriage movement with reference to the saw blade, in a very straight and horizontal path parallel to the saw line. The guide rail is normally a true rail having a flange at the bottom, a head at the top and a web therebetween. Unlike conventional railroad or trolly rails, however, the saw mill guide rail head must have one or more accurately formed surfaces which serve to control the rolling movement of a guide wheel thereon in a very true straight path. Normally, the guide rail head is provided with two beveled surfaces, with one such surface on each side of the rail head adapted to support and guide mating flanges on either side of the carriage guide wheels riding thereon. The beveled head surfaces are carefully machined to provide exacting dimensions and angles, with the resulting head having a frusto-conical cross-section. Such guide rails are often times referred to as a V-track. The purpose of the beveled surfaces is to keep the carriage guide wheels securely aligned on the rail without any possibility of axial motion of the wheel on the rail. To this end, the carriage guide wheels riding on the guide rail are dimensioned such that two opposed flanges thereon are the only portion of the guide wheels in contact with the rail, so that the flanges on the carriage guide wheels will ride on and follow the true straight beveled surfaces of the guide rail. The spacing between the two wheel flanges is intentionally maintained to be sufficiently narrower than the upper horizontal surface of the rail head so that the cylindrical face of the guide wheel between the flanges, does not itself engage or contact any portion of the guide rail. Therefore, the carriage travel is more accurately controlled since the path of travel is controlled only by the flanges of the guide wheels riding on the beveled guide surfaces of the rail head.

Since only one guide rail is essential to keep the carriage motion in a straight line, the other rail is normally just a flat steel track upon which flat cylindrical carriage wheels ride. Normally the guide rail is located as the track furthest from the saw blade to minimize the chances of saw dust and bark falling thereon and causing a distortion in the path of travel or even carriage derailment.

It is of critical importance that the sawmill tracks, particularly the guide rail, be very accurately aligned so that the carriage will travel in a single, horizontal plane, and in a very straight line, as perfectly parallel as possible to the saw blade and saw line. In order to maintain proper alignment of all components, is it of course essential that the frame and rails be mounted on firm, solid footings and supports so that the components will retain a proper alignment during use.

Since the guide wheels on one side of the carriage are different from the flat wheels on the other side of the carriage, the radius of the two different types of wheels may not be identical from the axis to the point of contact with the track. Therefore, the two tracks may not necessarily lie in the same plane, but they should, nevertheless, lie in planes that are parallel, so that the carriage will travel thereon in a flat horizontal path throughout its length of travel.

The typical procedure for aligning the tracks usually involves the temporary fastening of the tracks in place, beginning next to the saw blade, assuring that they are properly spaced therefrom and parallel thereto, and then working outward in both directions to align each successive length of track. The tracks are generally leveled in a horizontal plane using a level and wedges or shims where necessary. After the tracks are temporarily secured in place and properly spaced from the saw blade, the guide rail must be aligned in a straight line, spaced from and parallel to the saw blade cutting line. To do this, a length of string, or preferably piano wire, is stretched alternately along the upper surface of the rail head and along the side surface of the rail head while the rail's position is adjusted to be properly aligned for straightness and flatness with the stretched string or piano wire. This later procedure is not only time consuming and labor intensive, but is not as accurate as could be desired. Indeed, the stretched string or piano wire will always have some degree of sag, and the string or piano wire cannot be permitted to contact the rail least such contact will cause some deviation from a true straight line. Since the string or piano wire cannot contact the rail head, such an alignment procedure is at best an eye-ball determination of alignment, subject to human judgment, and of course, human error.

SUMMARY OF THE INVENTION

This invention is predicated on a unique new and improved sawmill guide rail having a built in means for aligning the guide rail, which not only greatly simplifies and speeds the alignment procedure, but also assures a far greater degree of accuracy in the resulting alignment by eliminating any reliance on visual judgment. The built in means for alignment consists of two intersecting surfaces machined or otherwise formed into the rail head which run the length of the rail head parallel to the line of travel. The two machined surfaces provide an angle of intersection within which a straight-edge guide tool can be positioned to align the rail more quickly, more easily and more accurately, as to either or both its straightness and flatness, as compared to any prior art technique.

DESCRIPTION OF THE PREFERRED EMBODIMENT

Figure 1:
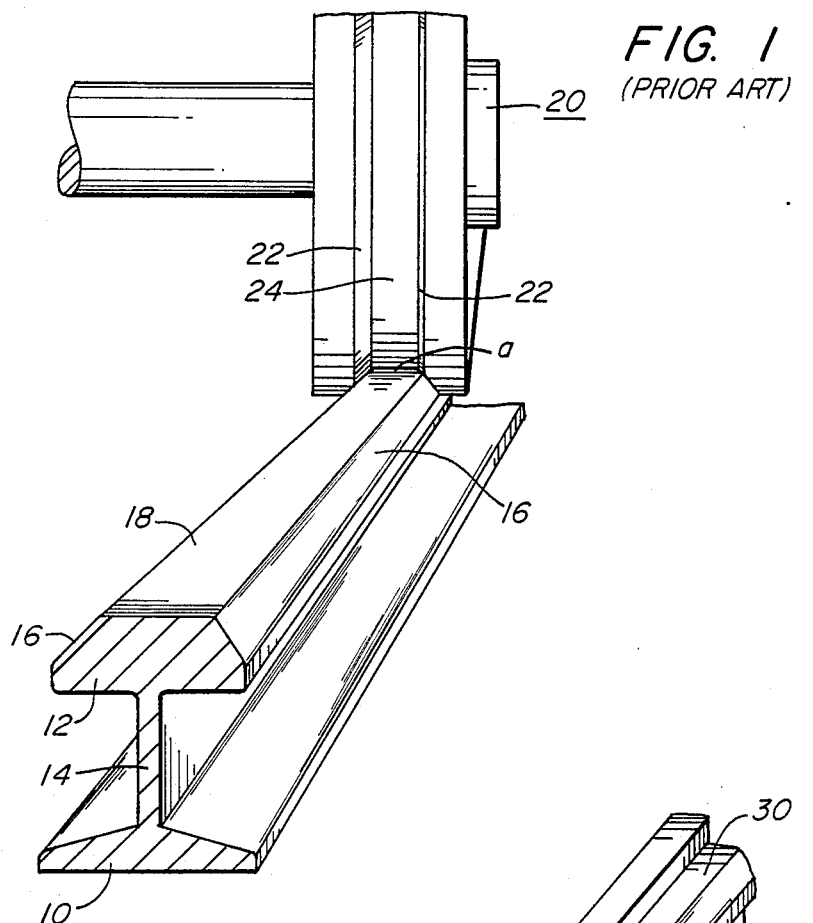
FIG. 1 is an isometric view of a short length of a typical prior art guide rail further showing a carriage guide wheel engaged on the rail head.

Reference to FIG. 1, illustrating the prior art, may serve to provide a better understanding of this invention. The prior art guide rail shown in FIG. 1 comprises a base flange 10, a head 12 and a web 14. The rail head 12 is provided with two beveled machined surfaces 16 on each side of the rail head 12 and running for the full length of the rail head 12 parallel to the line of travel of any wheel on said rail. These two surfaces 16 are angled and positioned so as to provide the rail head 12 with a frusto-conical cross-section and adapted to receive the carriage guide wheel 20, as shown. When carriage guide wheel 20 is engaged on the guide rail, the flanges 22 on guide wheel 20 must ride on beveled surfaces 16 of the guide rail such that the cylindrical surface 24 of guide wheel 20 does not contact the guide rail, but rather is spaced therefrom by a suitable distance "a", as shown. Therefore, should any saw dust, bark or any other debris fall on the guide rail, it cannot come to rest on the beveled surfaces 16, but only on the upper surface 18 of the rail head 12. Since the cylindrical surface 24 of guide wheel 20 is spaced away from the upper surface 18 on the rail head 12, any such debris will not interfere or disrupt the true straight path of the guide wheel 20 or the carriage supported thereby. The weight of the carriage and load thereon will keep the two wheel flanges 22 firmly engaged against surfaces 16 on the rail, so that the wheels will accurately follow and travel whatever path is defined by the surfaces 16. Obviously, the wheels 20 should be mounted on the carriage such that there is no end-play.

Figure 2:
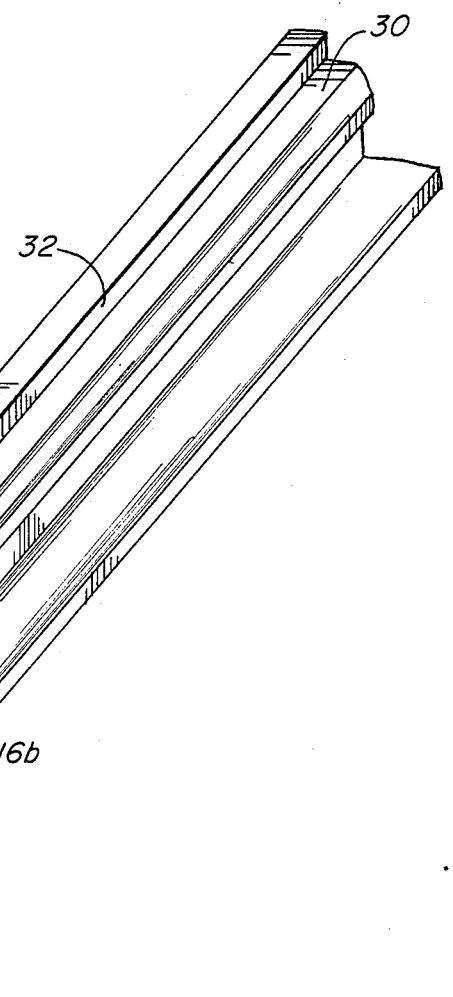
FIG. 2 is an isometric view of a guide rail according to one embodiment of this invention.
Figure 3:
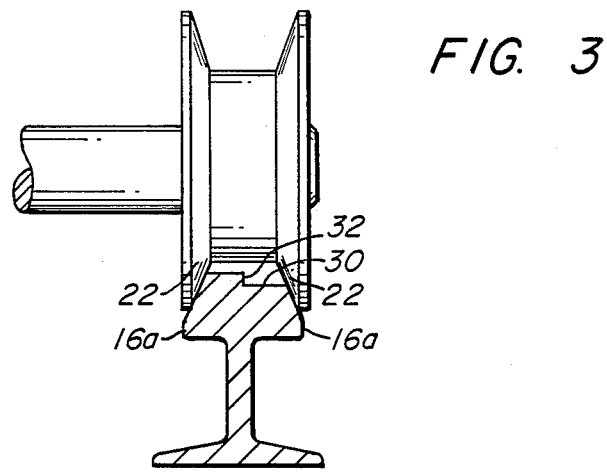
FIG. 3 is a sectional end view of the inventive guide rail shown in FIG. 2 further showing a carriage guide wheel engaged on the head thereof.
Figure 4:
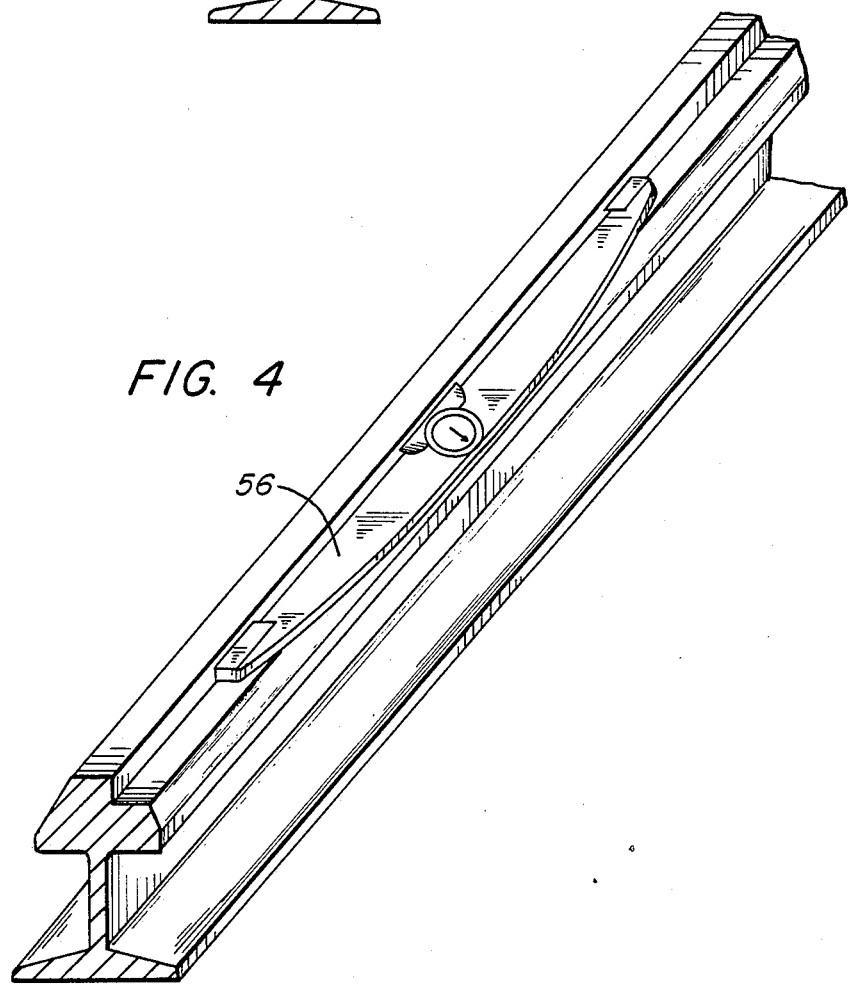
FIG. 4 is another isometric view of the guide rail shown in FIG. 2 further illustrating a straight-edge positioned within the machined surfaces as necessary to align the rail straightness.
Figure 5:
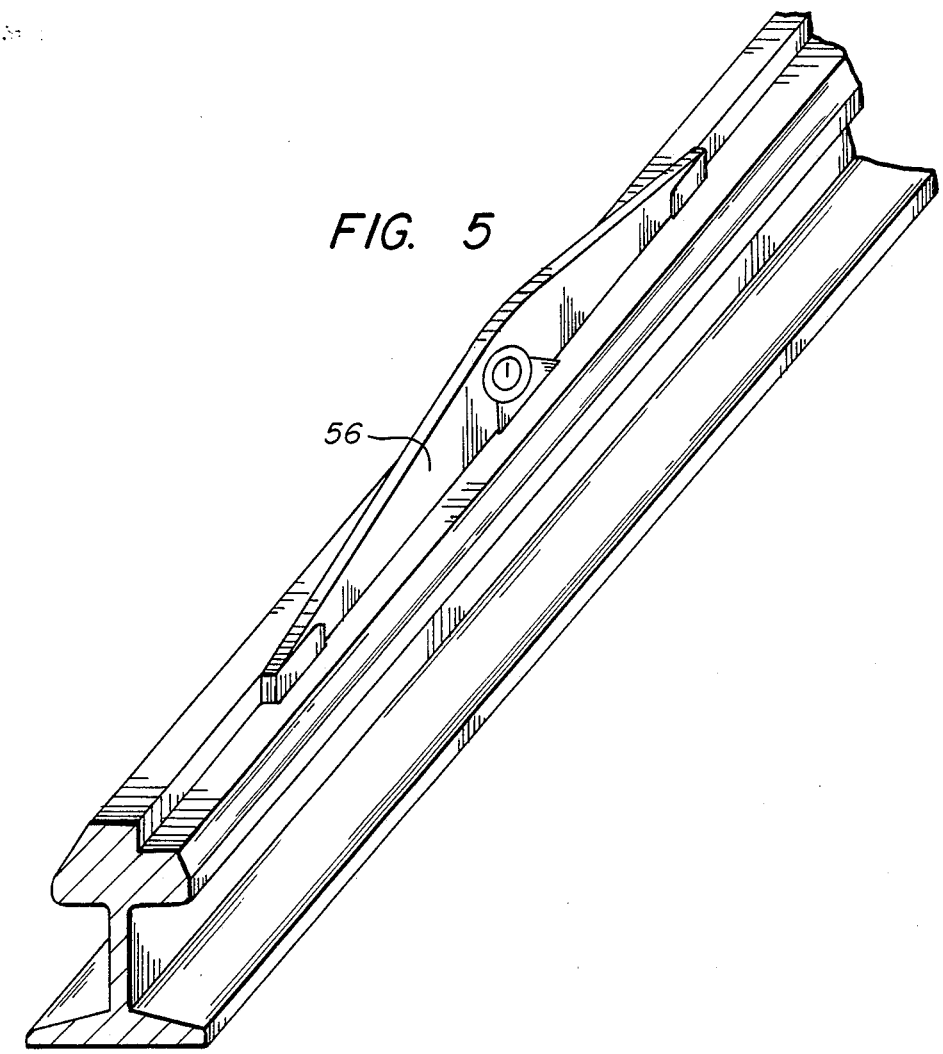
FIG. 5 is a view like that of FIG. 4 showing the straight-edge in position as necessary to align the rail flatness.

In accordance with one embodiment of this invention as illustrated in FIGS. 2 and 3, the inventive guide rail may similarly comprise a base flange, 10a, a head 12a and a web 14a, having an arrangement and dimensions in full accord with the prior art guide rail shown in FIG. 1, or any other prior art guide rail. In a like fashion, the guide rail of this invention should also have guide surfaces machined into the rail head 12a such as beveled surfaces 16a and 16b, which will serve the same function as described above for surfaces 16 on the prior art rail.

The crux of this inventive guide rail resides in the intersecting planar surfaces 30 and 32, which are additional surfaces machined into rail head 12a, and in essence are formed by removing a small rectangular section from the upper corner of rail head 12a, extending for the full length of the rail. Planar surfaces 30 and 32 must be parallel to the line of travel on the rail head 12a, i.e. parallel to surfaces 16a and 16b, and positioned and dimensioned so the surfaces do not present any interference for the free rolling of flanges 22 on the guide wheel 20 of beveled surfaces 16a and 16b. As shown, machined surface 30 is a horizontal surface which extends only partially across the width of head 12a, while machined surface 32 is a vertical surface, intersecting surface 30 at the approximate midpoint of the rail, with the two surfaces intersecting at a right angle to each other. The size and dimensions of surfaces 30 and 32 are not critical provided the surface widths are sufficient to provide a reasonable working depth for the placement of a straight-edge to perform the essential measurement. The depth of surface 32 should, however, be small enough that a significant amount of beveled surface 16b remains on rail head 12a for the purpose of providing a surface 16b sufficient to support and guide a wheel flange 22 thereon. In order to minimize machining requirements as well as wear of beveled surface 16b, the depth of surface 32 should ideally be no more than necessary for the adequate placement of the straight-edge, typically no more than about ⅛ inch, and may be as narrow as 0.05 inch. As shown in FIG. 3, the circular flanges 22 on guide wheel 20 will still ride on the beveled guide surfaces 16a and 16b, so that the removal of a section of metal for the formation of intersecting surfaces 30 and 32 does not interfere with the operation of the guide wheels on the guide rail.

The benefit of the above inventive guide rail is appreciated when the rail is mounted to its supporting structure during its alignment. In utilizing this inventive guide rail, one need not resort to the use of a stretched string or piano wire for aligning the guide rail. Instead, one may utilize a conventional straight-edge placed against surface 32 to align the guide rail straightness, and against surface 30 to align the guide rail flatness.

Figure 6:
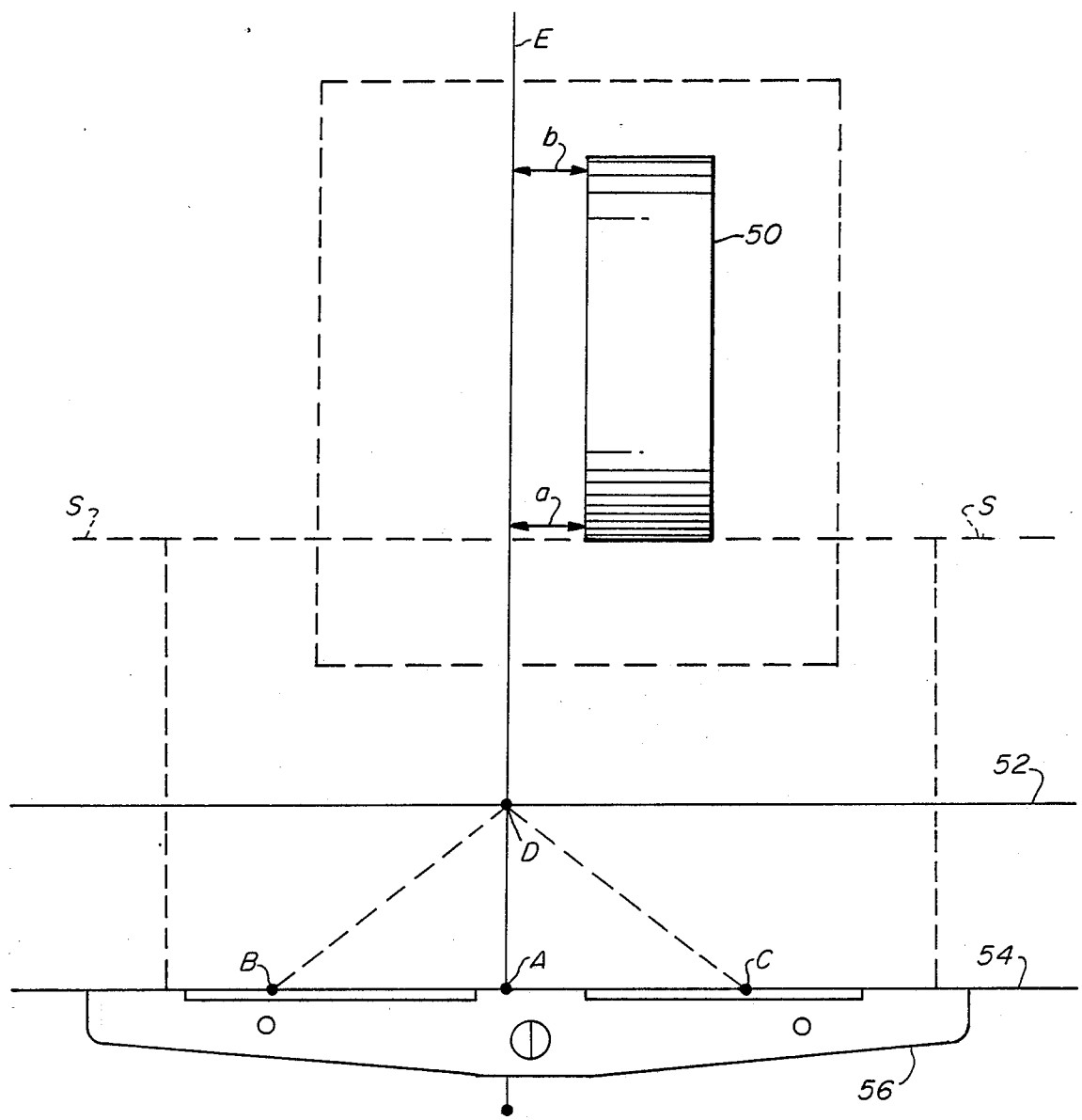
FIG. 6 is a plan view of a typical saw mill lay-out, showing the relationship between the saw blade and the carriage tracks, and serves to depict the starting procedure for aligning the guide rail.

Reference to FIG. 6 will illustrate one example of aligning the guide rail to a band saw, for example, where bottom wheel 50 is the cylindrical wheel which drives the band saw blade (not shown) which will cut logs on saw line S—S. To begin the procedure, a line which is parallel to the axis of bottom wheel 50, and perpendicular to the saw line S—S, is taken from any point E behind the saw blade, across flat track 52 and to point A on guide rail 54, point A being on the upper surface of guide rail 54 and preferably at the line of intersection with the vertical surface 32. Procedures for establishing such a line perpendicular to the saw line S—S are well known to those skilled in the art, and are fully described in *Saws, Design-Selection-Operation-Maintenance*, Ed M. Williston, Miller-Freeman Publications, 4th Printing, June 1988, pages 102-104, and other publications. Point A on the guide rail and point D on the flat track are then punched for marking. Thereafter, points B and C are punched on the guide rail 54, which are equidistant points on either side of point A. Then a slick or rule with trammel points is utilized to adjust the guide rail 54 so that points B and C are also equidistant from point D on the flat track 52. At this point in the procedure, the guide rail 54, is parallel to saw line S—S at least between points B and C. In some situations, it will be possible to use factory location marks to extend a line to the guide rail 54. After the segment B-C is aligned parallel to saw line S—S, the balance of the guide rail 54 can be aligned by utilizing a straight-edge 56. This effort is simply a matter of using the vertical surface 32 between points B and C as a reference, and then aligning the straightness of the rest of the guide rail 54 to be in line with that portion B to C. In a like manner, the placement of the straight-edge against surface 30 can be used to align the rail in a flat plane, which is far more accurate than using a level. This procedure is far simpler, quicker and more accurate than stretching a string or piano wire along the rail head length.

With reference to the straight-edge 56, it should be apparent that while any conventional straight-edge can be used, a far more accurate alignment can be achieved by utilizing a micrometer back gauge, such as the Widemire Micrometer Band Saw Back Gauge, as those manufactured by Armstrong Mfg. Co., 2135 N.W. 21st Avenue, Portland, Oreg. 07208; or Hanchett Mfg. Co., Big Rapids, Mich. 49307. Such gauges can gauge a deviation from a straight line of less than one one-thousandth of an inch, and are well known in the art.

It should be apparent from the above discussion that the machining of surfaces 30 and 32 should be effected within very close tolerances. Such tolerances, however, are also essential when machining the beveled surfaces 16 and 16a, so that the close machining of surfaces 30 and 32 does not bring any more exacting procedures into the production of the guide rail than is already the required practice. It should be appreciated that since close tolerances are required for all four surfaces, the assurance of parallelism between the four surfaces can be better assured if all four surfaces are machined on the same machine set-up.

In view of the above discussion, it should be apparent that numerous embodiments and modifications could be utilized without departing from the spirit of the invention. For example, the above described embodiment has been depicted to show the intersecting surfaces in combination with a particular form of guide rail. It should be apparent that the inventive surfaces which characterize this invention could be machined into guide rails having other configurations. Additionally, while the intersecting surfaces 30 and 32 are formed in the upper portion of the rail head, such surfaces could be formed in the lower portion of the head below one of the beveled surfaces. This position however, would merely add complications to the use and reading of the straight-edge without providing any benefit. In a like manner, the surfaces 30 and 32 are shown in an ideal arrangement whereby they are perpendicular to each other, with one face being horizontal and the other being vertical. It should be apparent that other arrangements could be utilized, as long as there are two intersecting faces on the rail head forming an angle within which a straight edged can be placed for determining the straight line position of the rail. Ideally, of course, the two surfaces are at a right angle to each other, one being horizontal and the other vertical so that one surface can be utilized to measure and set the rail straightness horizontally, and the other to measure and set the rail straightness vertically. If the two surfaces are not vertical and horizontal, the rail will be harder to adjust and set if the straight-edge must be positioned in planes other than horizontal and vertical. It is conceivable however, that one or both surfaces could be curved or slightly angled away from a true vertical or horizontal, and still form a straight line of intersection which could be utilized for positioning the straight-edge with comparable or near comparable results.

What is claimed is:

1. In a sawmill carriage guide rail of the type having a head portion with two beveled side surfaces upon which guide wheels of a sawmill carriage roll in a straight line of travel, the improvement comprising:

a groove formed into said head portion defined by two flat surfaces intersecting at a right angle and extending the length of said rail parallel to the line of travel of said guide wheels, one of said surfaces lying in a horizontal plane and the other surface lying in a vertical plane, and such that said surfaces do not interfere with said guide wheels rolling on said head, and such that an elongated straight-edge, having an edge and side surface, can be positioned lengthwise within said groove with its side against said surface in a horizontal plane and its edge against said surface in a vertical plane for purposes of determining and adjusting the rail straightness, and the position of the straight-edge can be reversed for purposes of determining and adjusting the rail flatness.

2. A method of aligning a sawmill carriage guide rail of the type having a head portion with two beveled side surfaces upon which guide wheels of a sawmill carriage roll in a straight line of travel, comprising:

A. forming a groove into said head portion defined by two flat surfaces intersecting at a right angle and extending the length of said rail parallel to the line of travel of said guide wheels, one of said surfaces lying in a horizontal plane and the other surface lying in a vertical plane and such that said surfaces do not interfere with said guide wheels rolling on said head;

B. positioning said rail on a suitable base against which it can be attached;

C. positioning a straight-edge, having an edge and side surface, lengthwise within said groove with its side against one of said surfaces and its edge against the other said surfaces to measure the alignment of said rail in a plane parallel to the straight line of travel and D. adjusting the rail to be in a straight line in that plane.

3. The method of claim 2 in which said straight-edge is positioned within said groove and against each of said intersecting surfaces to measure and adjust the rail to be in a straight line in two planes.

4. The method of claim 3 in which one of said surfaces is horizontal and the other vertical so that said rail is measured and adjusted for both straightness and flatness.

5. The method of claim 2 in which said straight-edge is a micrometer back gauge.

* * * * *